United States Patent
Kumar

(10) Patent No.: US 8,655,823 B1
(45) Date of Patent: Feb. 18, 2014

(54) EVENT MANAGEMENT SYSTEM BASED ON MACHINE LOGIC

(75) Inventor: Manish Kumar, Karnataka (IN)

(73) Assignee: EMC Corporation, Hopkinton, MA (US)

( * ) Notice: Subject to any disclaimer, the term of this patent is extended or adjusted under 35 U.S.C. 154(b) by 397 days.

(21) Appl. No.: 13/069,492

(22) Filed: Mar. 23, 2011

(51) Int. Cl.
*G06F 17/00* (2006.01)
*G06N 5/02* (2006.01)

(52) U.S. Cl.
USPC .......................................................... 706/46

(58) Field of Classification Search
USPC .......................................................... 706/46
See application file for complete search history.

(56) References Cited

U.S. PATENT DOCUMENTS

| | | | |
|---|---|---|---|
| 7,921,153 B2 * | 4/2011 | Kumar | 709/203 |
| 7,945,619 B1 * | 5/2011 | Chawla et al. | 709/204 |
| 8,117,262 B2 * | 2/2012 | Kumar et al. | 709/205 |
| 8,370,018 B2 * | 2/2013 | Andreasen et al. | 701/31.6 |
| 8,447,826 B1 * | 5/2013 | Manmohan et al. | 709/214 |
| 8,447,961 B2 * | 5/2013 | Saha et al. | 712/241 |
| 8,468,326 B1 * | 6/2013 | Kang et al. | 712/221 |
| 8,516,105 B2 * | 8/2013 | Chawla et al. | 709/224 |

OTHER PUBLICATIONS

Ghosh et al., "A Study in Using Neural Networks for Anomaly and Misuse Detection," Proc. of the 8th USENIX Security Symposium, Aug. 23-26, 1999, 12 pages.
Japkowicz et al., "Autocorrel I: A Neural Network Based Network Event Correlation Approach," University of Ottawa; School of Information Technology and Engineering, Contractor Report, DRDC Ottawa CR 2005-030, May 2005, 156 pages.
Zhu, "CS838-1 Advanced NLP: The EM Algorithm," 2007, 6 pages, retrieved from http://pages.cs.wisc.edu/~jerryzhu/cs838/EM.pdf.

* cited by examiner

*Primary Examiner* — Michael B Holmes
(74) *Attorney, Agent, or Firm* — BainwoodHuang

(57) ABSTRACT

Improved techniques of identifying actions to take in response to events involve assigning, to each set of event parameter values which characterizes an event, a set of weight values, each weight value indicative of a probability of the event belonging to a cluster of events which follow a set of rules. To continue the previous example, an event management system may determine the probability of the first event belonging to the first cluster is 51% and that for the first event belonging to the second cluster is 49%, while the probability of the second event belonging to the first cluster is 49% and that for the second event belonging to the second cluster is 51%. In such a case, the event management system can be configured to respond to such similarly configured events in similar ways.

17 Claims, 5 Drawing Sheets

EVENT MANAGEMENT SYSTEM BASED ON MACHINE LOGIC

BACKGROUND

Conventional event management systems such as intrusion detection systems (IDS) identify actions to take in response to events such as the receipt of data packets at an access point of a network. For example, an IDS looks for events deemed malicious and, in response to such events, sends an alert to a network administrator.

Conventional event management systems characterize events received at access points of a network by parameter values which can include source and destination IP address values, source port number and timestamp. Such event management systems find events whose parameter values obey some predefined rules. An example of a predefined rule is, when three access requests are received at an access point of a network from the same source IP address within 60 seconds, an alert is sent to the network administrator.

Rules can be defined at a factory installation of a conventional event management system. Alternatively, rules can be custom defined by the network administrator.

SUMMARY

Unfortunately, there are deficiencies associated with the above-described conventional rules-based event management system. One weakness is that such rules-based event management systems are not realistically able to provide alerts for all malicious events having taken place in a network. Suppose, in the example above, the rules-based event management system receives three access requests within 61 seconds rather than 60 seconds. For such a series of events, the rules-based event management system would issue no alert although it is very likely that an alert should be issued. One could of course adjust the rule of this example to cause the event management system to issue such an alert, but finding an optimum time before which to cause an alert to be issued can take many iterations and may well prove impossible.

Another weakness of the conventional rules-based approaches lies in the difficulty of designing rules for event management systems which provide alerts to malicious events in real time. Event management systems discover malicious events through observing patterns of behavior which occur over time, as in the example above. In that example, even though it is likely that all of the access requests originated from a user with malicious intent, the first two requests of the event went through the event management system without initially causing the event management system to issue an alert.

One improvement to the manual provision of rules in rules-based event management systems lies in the application of machine learning algorithms to the discovery of patterns of behavior in events in real time. An example of a machine learning algorithm is an artificial neural network (ANN). In an ANN, past experience is used to build sets of training data on which the ANN is based. Suppose that there is a set of historical events for which an event management system triggered an alert. The parameter values which characterize these events are used as inputs into a mathematical system, the desired outputs of which are the same parameter values; such an ANN is an autoassociative ANN. For reasons related to the specific mathematical structure of the ANN, there will be a nonzero difference between the desired outputs, or inputs, and the actual outputs of the ANN. The event management system defines an error metric based on this difference and characterizes the events based on ranges of values of the error metric. As a specific example, an ANN groups together events having an error metric value between zero and 2% into a first cluster, events having an error metric value between 2% and 4% into a second cluster, and events having an error metric value greater than 4% into a third cluster. To each of the clusters, the event management system assigns rules which are obeyed by the events grouped into the cluster. Once the ANN has been constructed with the training data, the event management system uses the ANN to place new events into respective clusters based on their error value metrics and either issue or not issue alerts based on the rules assigned to each cluster.

Unfortunately, ANNs suffer some deficiencies as well. Such deficiencies are apparent in the hard boundaries between the ranges of error metric values in each cluster. For example, two very similar events may end up in different clusters because the first event produced an error metric value of 1.99% while the second event produced an error metric value of 2.01%. The placing of an event into an inappropriate cluster makes likely a false positive or false negative in an alert. In contrast to the above-described conventional approaches to identifying actions to take in response to events, improved techniques involve assigning, to each set of event parameter values which characterizes an event, a set of weight values, each weight value indicative of a probability of the event belonging to a cluster of events which follow a set of rules. To continue the previous example, an event management system may determine the probability of the first event belonging to the first cluster is 51% and that for the first event belonging to the second cluster is 49%, while the probability of the second event belonging to the first cluster is 49% and that for the second event belonging to the second cluster is 51%. In such a case, the event management system can be configured to respond to such similarly configured events in similar ways.

One embodiment of the improved techniques is directed to a method of identifying an action to take in response to a new event. The method includes receiving a new set of event parameter values which defines the new event. The method also includes finding, from a prior event database which stores (i) prior sets of event parameters and (ii) prior sets of weight values respectively assigned to the prior sets of event parameter values, a prior event database which stores (i) prior sets of event parameters and (ii) prior sets of weight values respectively assigned to the prior sets of event parameter values. The method further includes assigning a new set of weight values to the new set of event parameter values based the particular prior sets of event parameters found from the prior event database. The method further includes selecting, as the action to take, one of multiple predefined possible actions based on the new set of weight values assigned to the new set of event parameter values which define the new event.

Additionally, some embodiments of the improved technique are directed to a system configured to identify an action to take in response to a new event. The system includes a network interface coupled to a network, a memory and a processor coupled to the memory, the processor configured to carry out the method of controlling access to a resource.

Furthermore, some embodiments of the improved technique are directed to a computer program product having a non-transitory computer readable storage medium which stores code including a set of instructions to carry out the method of identifying an action to take in response to a new event.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Improved techniques of identifying actions to take in response to events involve assigning, to each set of event parameter values which characterizes an event, a set of weight values, each weight value indicative of a probability of the event belonging to a cluster of events which follow a set of rules. To continue the previous example, an event management system may determine the probability of the first event belonging to the first cluster is 51% and that for the first event belonging to the second cluster is 49%, while the probability of the second event belonging to the first cluster is 49% and that for the second event belonging to the second cluster is 51%. In such a case, the event management system can be configured to respond to such similarly configured events in similar ways.

Figure 1:
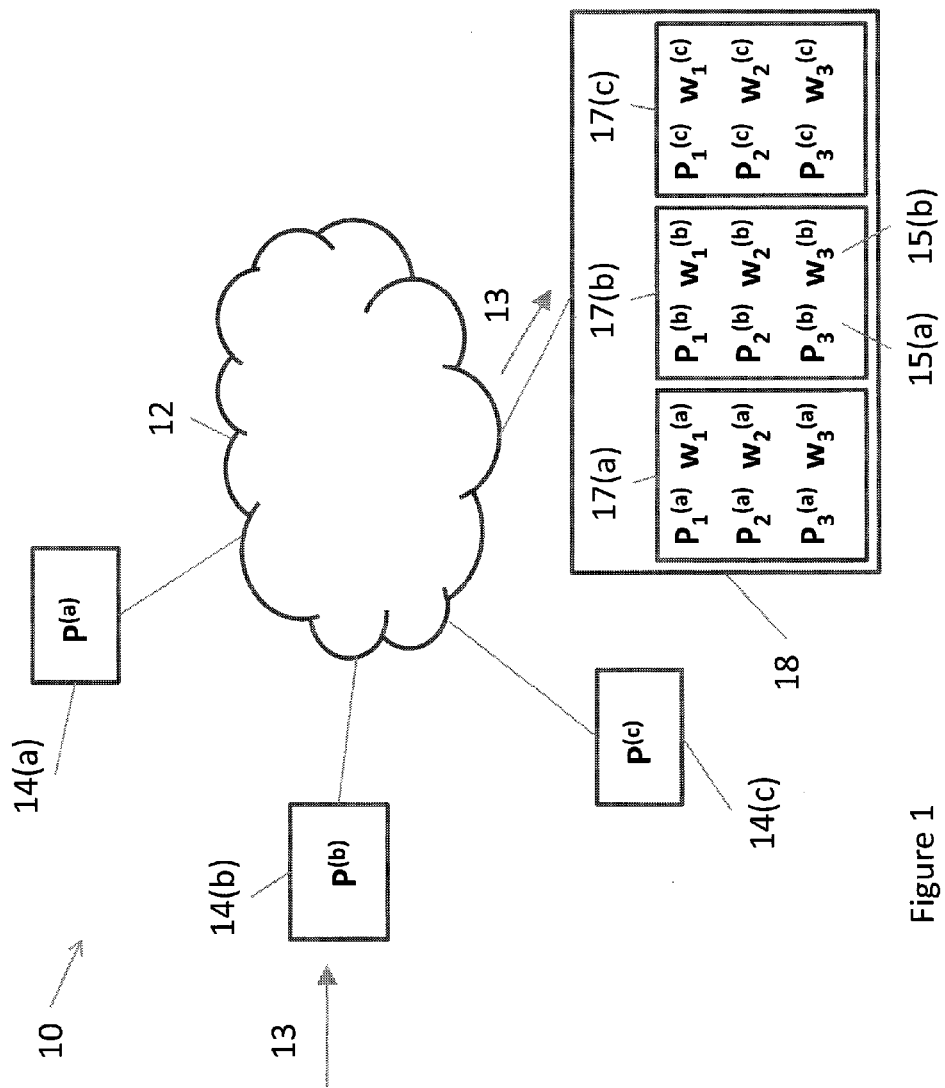
FIG. 1 is a schematic diagram of an electronic environment configured to carry out the improved technique.

FIG. 1 shows an electronic environment 10 which is suitable for use by the improved technique. Electronic environment 10 includes communication medium 12, access point devices 14(a), 14(b) and 14(c) [access point devices 14], administration server 16 and event management system 18.

Communication medium 12 provides connections between access point devices 14, administration server 16 and event management system 18. The communications medium 12 may implement a variety of protocols such as TCP/IP, UDP, ATM, Ethernet, Fibre Channel, combinations thereof, and the like. Furthermore, the communications medium 12 may include various components (e.g., cables, switches, gateways/bridges, NAS/SAN appliances/nodes, interfaces, etc.). Moreover, the communications medium 12 is capable of having a variety of topologies (e.g., hub-and-spoke, ring, backbone, multi-drop, point-to-point, irregular, combinations thereof, and so on).

Access point devices 14 are constructed and arrange to receive signals in the form of data packets which contain information sent by a user from a remote system, the receipt of each data packet defining an event. Access point devices 14 are also configured to receive a particular type of data packet. For example, access point device 14(a) is a Windows™ Host device, access point device 14(b) is a firewall device and access point device 14(c) is a Solaris™ host device. Data packets received by different access point devices 14 are characterized by different sets of event parameter values. For example, a data packet at Windows™ Host device 14(a) is characterized by values of event source, event user, event type and timestamp of the message (parameter values $P^{(a)}$); a data packet at the firewall device 14(b), on the other hand, is characterized by values of source IP, destination IP, source and destination port, and timestamp of the message (parameter values $P^{(b)}$); Solaris™ host device 14(c) is characterized by values of event source, event user, event type and timestamp of the message (parameter values $P^{(c)}$).

Event management system 18 is configured and arranged to assign a new set of weight values to each new set of parameter values which characterize a new data packet received by the access point devices 14. Event management system 18 includes prior event databases 17(a), 17(b) and 17(c) (prior event databases 17) which are configured to store prior sets of event parameter values received by access point devices 14(a), 14(b) and 14(c), respectively, at previous points in time. Each prior event database 17 is further configured to store prior sets of weight values which were assigned to the prior sets of event parameter values.

In an example illustrated in FIG. 1, prior event database 17(b) stores prior sets of event parameter values $P_1^{(b)}$, $P_2^{(b)}$, $P_3^{(b)}$ and prior sets of weight values $w_1^{(b)}$, $w_2^{(b)}$, $w_3^{(b)}$, respectively. The assigning of the new set of weight values to the new set of event parameter values is based on the prior sets of event parameter values and the respective prior sets of weight values. More specifically, event management server 18 finds particular prior sets of event parameters which match the new set of event parameter values within predefined matching criteria. In one instance, a predefined matching criterion involves an exact match in source IP address values for the new data packet and a prior data packet. Other matching criteria as well as further details related to the assignment of the new set of weight values will be explored in examples below with reference to FIG. 4.

Event management system 18 is further constructed and arranged to select, as an action to take, one of multiple predefined possible actions based on the new set of weight values $w_N^{(b)}$ assigned to the new set of event parameter values $P_N^{(b)}$. For example, one predefined possible action to take is to issue an alert in response to receiving the new data packet characterized by the new set of event parameter values $P_N^{(b)}$.

During operation, a new data packet 13 is received at access point device 14(b) which sends the new data packet to event management server 18. Upon receipt of new data packet 13, event management server 18 extracts the new set of event parameter values $P_N^{(b)}$ which characterize the new data packet. Event management server 18 then performs a series of matching operations between the new set of event parameter values $P_N^{(b)}$ and each prior set of event parameter values stored in prior event database 17(b). The matches found in the matching operation determine particular prior sets of event parameter values $P_2^{(b)}$ and $P_3^{(b)}$ which event management server 18 uses in assigning a new set of weight values $w_N^{(b)}$ to the new set of event parameter values $P_N^{(b)}$. Event management server 18 assigns the new set of weight values $w_N^{(b)}$ to the new set of event parameter values $P_N^{(b)}$ based upon the particular prior sets of event parameter values $P_2^{(b)}$ and $P_3^{(b)}$ and the prior sets of weight values $w_2^{(b)}$ and $w_3^{(b)}$ assigned to them, respectively. Event management server 18 then takes one of multiple predefined possible actions based on the new set of weight values $w_N^{(b)}$ assigned to the new set of event parameter values $P_N^{(b)}$.

An advantage of basing an action to be taken on a set of weight values is that arbitrary hard boundaries which separate clusters obeying different rules are eliminated. That is, small changes in event parameter values will result in small changes—or no change—to the response to the receipt of a data packet characterized by the event parameter values. Further, machine learning tools applied to the improved techniques described here will result in more accurate classification of data packets into clusters obeying a particular set of rules. The improved techniques then allow for a more robust way of identifying actions to take in response to events.

Additional details of how event management server 18 identifies actions to take in response to events will be explained below with regard to FIG. 2, FIG. 3 and FIG. 4.

Figure 2:
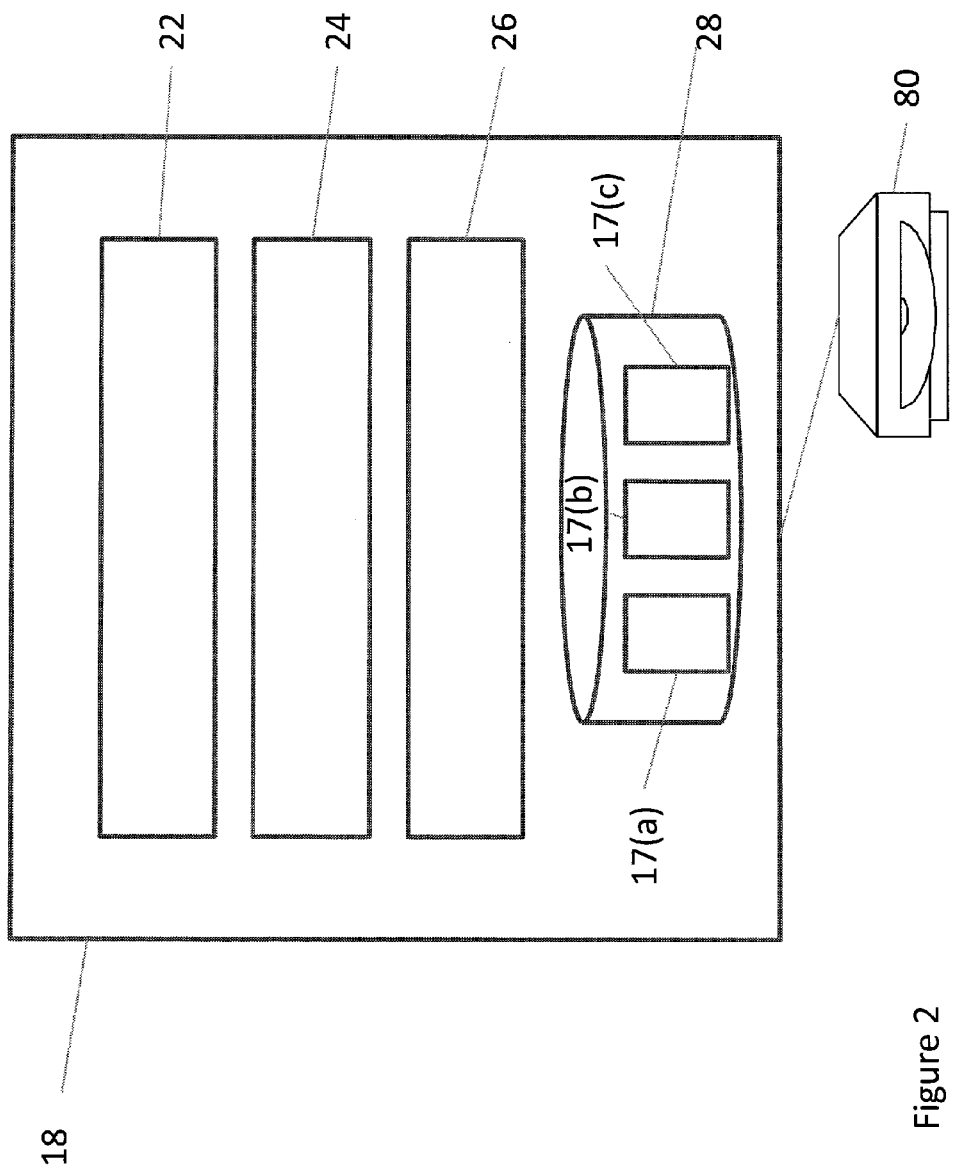
FIG. 2 is a schematic diagram of an event management system for use in the electronic environment of FIG. 1.

FIG. 2 shows further detail of event management server 18. Event management server 18 includes processor 22, memory 24, network interface 26 and storage medium 28.

Memory 24 is configured to store a computer program 80 which is constructed and arranged to identify actions to take in response to events. Memory 24 generally takes the form of, e.g., random access memory, flash memory or a non-volatile memory.

Processor 22 can take the form of, but is not limited to, an Intel or AMD-based MPU, and can be a single or multi-core running single or multiple threads. Processor 22 is coupled to memory 24 and is configured to execute the computer program 80 stored in memory 24.

Network interface 26 is configured to receive data packet 13 from access point device 14(b).

Storage medium 28 is constructed and arranged to store prior event databases 17.

Figure 3:
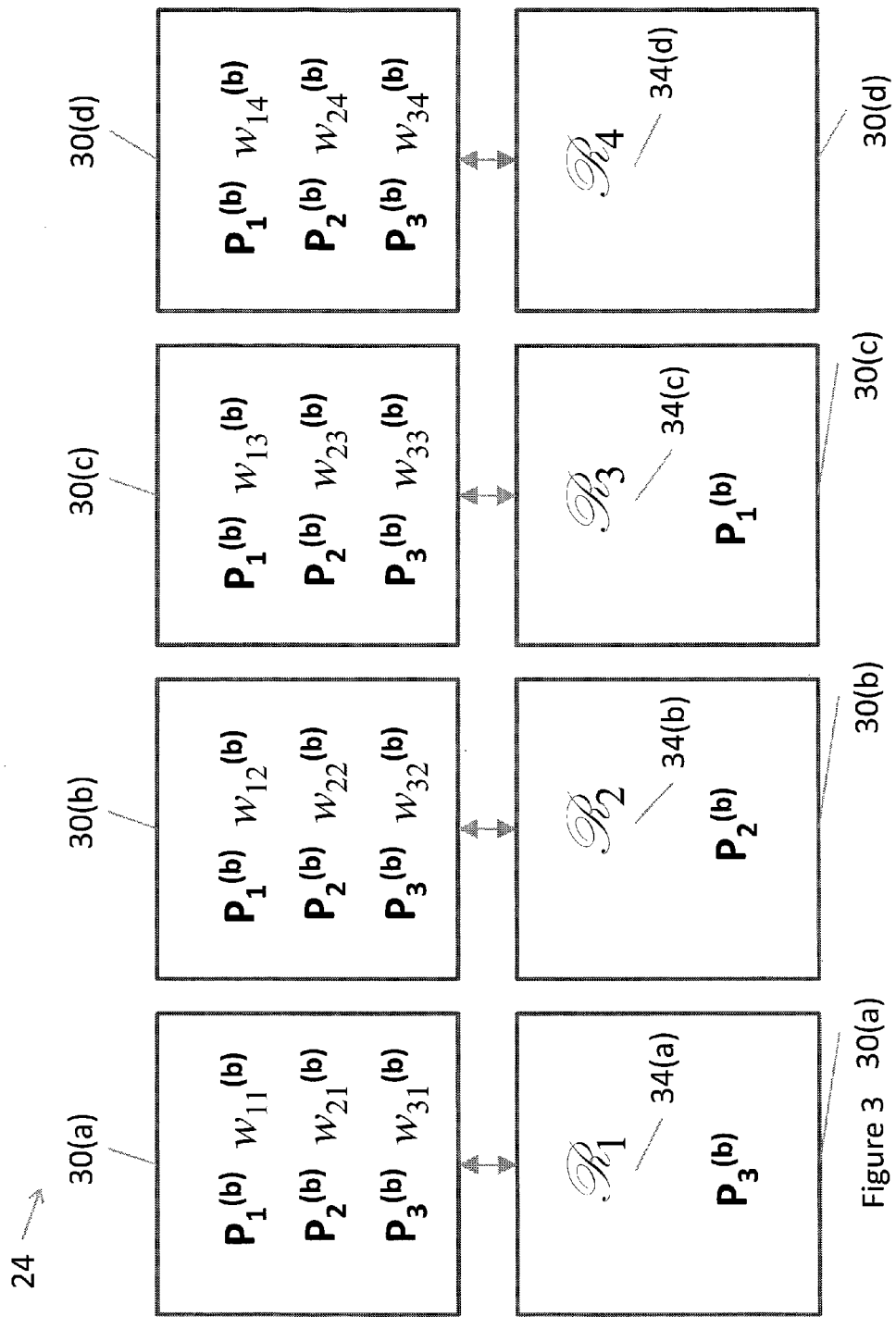
FIG. 3 is a schematic diagram of an arrangement of clusters in which sets of event parameter values are grouped by the event management system of FIG. 2.

FIG. 3 illustrates one particular arrangement, stored in memory 24, of a clustering of prior sets of event parameter values and the reimagining of the clustering into a "fuzzy" clustering which includes the weight values. The example illustrated in FIG. 3 involves four clusters 30(a), 30(b), 30(c) and 30(d) (clusters 32). Each cluster is associated with a rule set 34(a), 34(b), 34(c) and 34(d) (rule sets 34). To each cluster belong sets of event parameter values which obey the rule set associated with the cluster. In the example, $P_1^{(b)}$ is nominally grouped into cluster 30(c) associated with rule set 34(c), $P_2^{(b)}$ is grouped into cluster 30(b) associated with rule set 34(b) and $P_3^{(b)}$ is grouped into cluster 30(a) associated with rule set 34(a).

In the improved techniques, the sets of weight values include a weight value for each rule set. In FIG. 3, $w_1^{(b)} = (w_{11}^{(b)}, w_{12}^{(b)}, w_{13}^{(b)}, w_{14}^{(b)})$, $w_2^{(b)} = (w_{21}^{(b)}, w_{22}^{(b)}, w_{23}^{(b)}, w_{24}^{(b)})$, $w_3^{(b)} = (w_{31}^{(b)}, w_{32}^{(b)}, w_{33}^{(b)}, w_{34}^{(b)})$. That is, instead of associating a set of event parameter values with a single cluster 30, the set of event parameter values is associated with all of the clusters 30 with the caveat that, within each cluster 30, the set of event parameters is associated with a weight value for that cluster 30. In some arrangements, the weight value for a cluster 30 is interpreted as a probability of the set of event parameter values obeying the rules of the rule set 34 associated with the cluster 30. This interpretation of the weight values will be valid for the examples to follow, although other interpretations are possible.

In some further arrangements, the selection, as the action to take, of one of multiple predefined possible actions includes assigning the new set of event parameter values to a cluster based on the assigned new set of weight values. For example, the new set of event parameter values is assigned to the cluster for which the corresponding weight value has the largest value.

Suppose that $P_1^{(b)}$ is (source IP=135.8.60.182; destination IP=172.16.114.169; source port=10; destination port=21297; timestamp=Apr. 5, 2009:23:27), and $w_1^{(b)}$ is (0.05,0.19,0.73, 0.03). Also, suppose that $P_2^{(b)}$ is (source IP=196.227.33.189; destination IP=172.16.111.194; source port=23; destination port=18513; timestamp=Apr. 5, 2009:36:14)), and values $w_2^{(b)}$ is (0.33,0.51,0.11,0.05). Further, suppose that $P_3^{(b)}$ is (source IP=196.227.33.188; destination IP=172.16.114.169; source port=23; destination port=21297; timestamp=Apr. 5, 2009:23:56), and a corresponding instance of prior set of weight values $w_3^{(b)}$ is (0.67,0.19,0.09,0.05). That is, $P_1^{(b)}$ has a 5% chance of being associated with cluster 30(a), a 19% chance of being associated with cluster 30(b), a 73% chance of being associated with cluster 30(c) and a 3% chance of being associated with cluster 30(d). In this case, $P_1^{(b)}$ is assigned to cluster 30(c). Similarly, $P_2^{(b)}$ is assigned to cluster 30(b) and $P_3^{(b)}$ is assigned to cluster 30(a).

In some arrangements, event management server 18 configures the clusters 30 via a machine learning algorithm. Details of the machine learning algorithm are illustrated with reference to FIG. 4.

Figure 4:
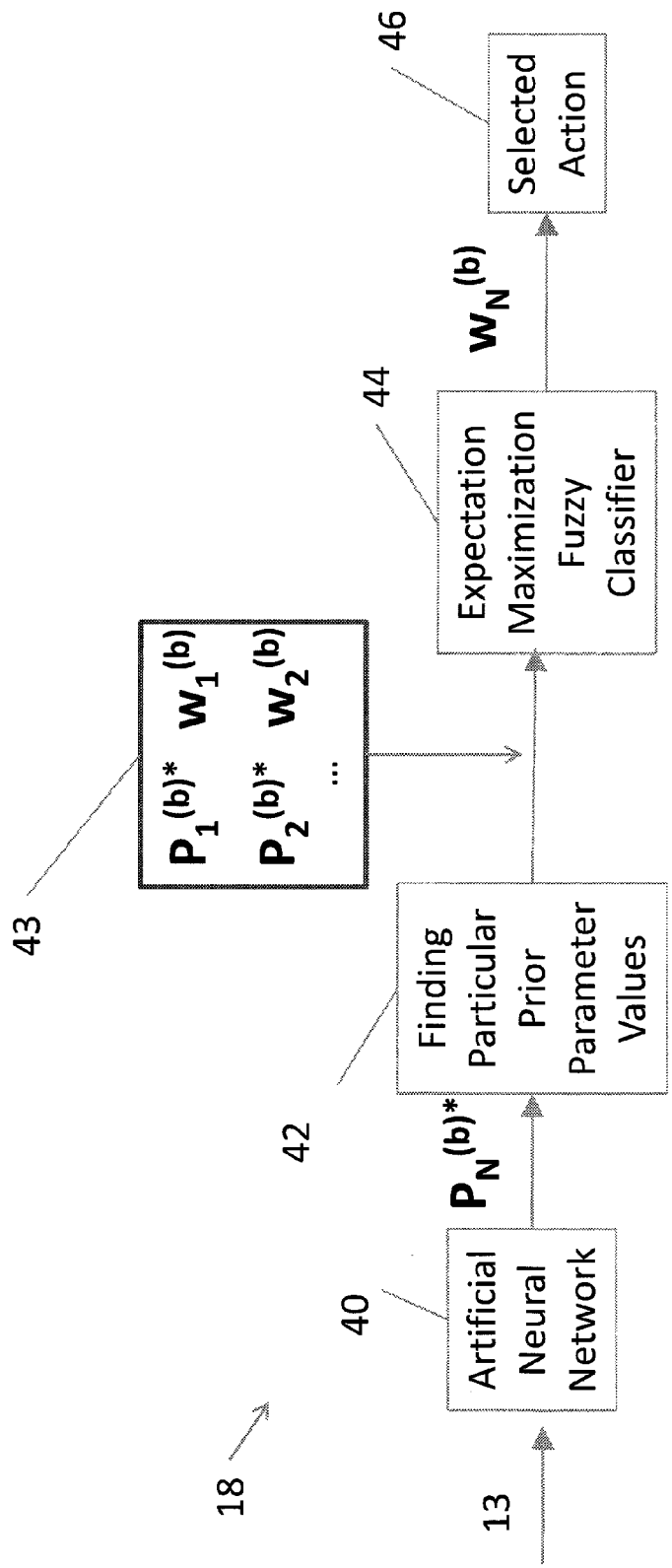
FIG. 4 is a flow chart illustrating the generation of sets of weights corresponding to new events from which sets of parameter values are extracted as illustrated in FIG. 2.

FIG. 4 illustrates a process of selecting an action to take in response to events according to the improved techniques. Data packet 13 is received at event management server 18 via access point device 14(b) (see FIG. 1). Once data packet 13 is received at event management server 18, event management server 18 extracts a new set of event parameter values $P_N^{(b)}$ from data packet 13. From the new set of event parameter values $P_N^{(b)}$, event management server 18 performs a matching 42, according to predefined matching criteria, to find particular prior sets of event parameter values stored in prior event database 17(b) (see FIG. 1). Based on the particular prior sets of event parameter values, event management server 18 employs a machine learning algorithm 44 to determine the probabilities of the new set of event parameter values $P_N^{(b)}$ being associated with a set of rules 34 (see FIG. 3). Based on these probabilities, event management server 18 selects an action 46 to take in response to the event of the event management server receiving data packet 13.

For the example to follow, the predefined matching criteria take the following form. Each parameter value of the sets of event parameter values is normalized to a value between zero and one. For instance, because IP address range between the values 0.0.0.0 and 255.255.255.255, there are $256^4=4294967296$ possible IP addresses so that a normalized version of IP address a.b.c.d may be represented by the floating point number form of the fraction $$\frac{256^3 a + 256^2 b + 256 c + d + 1}{256^4}.$$

Similar normalization schemes are available for other parameter values in the sets of event parameter values. A match is said to occur between a prior set of event parameter values and the new set of event parameter values when an absolute difference between an event parameter value of the prior set of event parameter values and a corresponding event parameter value of the new set of event parameter values is less than a specified threshold value. A typical threshold value is $10^{-8}$; threshold values are specified based on a desired range of parameter values defining a match.

To illustrate this matching, assume a new data packet has a new set of event parameter values $P_N^{(b)}$: (source IP=196.227.33.189; destination IP=172.16.114.193; source port=23; destination port=15153; timestamp=Apr. 5, 2009: 24:29). A normalized parameter values are then (source IP=0.7690907563; destination IP=0.6721259807; source port=0.0003509521; destination port=0.2312164307; timestamp=0.2586082255). Upon finding similar normalizations for the prior sets of event parameter values $P_1^{(b)}$, $P_2^{(b)}$ and $P_3^{(b)}$, the matching described above finds the particular prior sets of event parameter values to be $P_2^{(b)}$ and $P_3^{(b)}$.

Once event management server 18 finds the particular prior sets of event parameter values and the assigned prior sets of weight values, event management server 18 employs machine learning algorithm 44 which assigns the new set of weight values $w_N^{(b)}$ to the new set of event parameter values $P_N^{(b)}$. In some arrangements, machine learning algorithm 44 is a naïve Bayes algorithm; in other arrangements, machine learning algorithm is an expectation-maximization (EM) algorithm. Other machine learning algorithms are possible.

In a naïve Bayes algorithm, a probability distribution is estimated for each cluster 30. An example of a probability distribution is a gaussian distribution having a mean µ and variance $\sigma^2$. A net probability distribution is estimated as a weighted sum of the probability distributions for each cluster, the weights being event-independent probability values assigned to each cluster. The estimation of each probability distribution is made according to a maximization of a log-likelihood estimator, which in turn is estimated from the particular prior sets of event parameter values and the prior sets of weight values respectively assigned to the particular prior sets of event parameter values. Event management server 18 then computes the weight values of the new set of weight values $w_N^{(b)}$ from evaluating the value of the net probability distribution for each cluster 30 at the value of each parameter value of the new set of event parameter values $P_N^{(b)}$.

In an EM algorithm, on the other hand, a naïve Bayes algorithm is used as a starting point. That is, an initial set of means and variances, as well as a set of weight values of the new set of weight values, are estimated in a similar manner to the naïve Bayes procedure outlined above. The EM algorithm, however, is recursive: the latest estimate of the weight values of the new set of weight values are used to determine a latest estimate for the means and variances of the probability distributions for each cluster, which in turn are used to determine another, more accurate estimate for the weight values of the new set of weight values. As the probability distributions are estimated, a log-likelihood estimator is evaluated using the latest estimate of the weight values of new set of weight values and the event-independent probability values assigned to each cluster. The log-likelihood estimator is indicative of a validity of assigning the latest new set of weight values to the new set of event parameter values. In an EM algorithm, the value of the log-likelihood estimator increases with each iteration of the recursion while attaining a limit. The recursion is therefore continued until an absolute difference between the value of the log-likelihood estimator at a first iteration counter value and the value of the log-likelihood estimator at a second iteration counter value is smaller than a predefined threshold value.

To illustrate as an example, suppose that the probability distributions for each cluster are taken to be gaussian distributions having a mean µ and variance $\sigma^2$. Event management server 18 computes initial values of these means and variances for each normalized parameter over the particular prior sets of parameter values in each cluster. That is, values of mean source IP and source IP variance are computed in each cluster according to the source IP values in the cluster as well as the weight values assigned to the source IP values; means and variances for destination IP, source port number, etc. An initial probability distribution for a cluster is the product of the gaussian distributions for each parameter in the cluster. The new weight value for the cluster is the value of the initial probability distribution evaluated at the event parameter values of the new set of event parameter values.

A log-likelihood estimator is taken to be logarithm of a weighted average of the new weight values. In situations with actions to be identified for more than one new event, the log-likelihood estimator is the sum of the weighted averages of each new set of weight values. The log-likelihood estimator is evaluated at each estimation of new sets of weight values.

For the EM algorithm, the new weight values are used to build new estimates for the means and variances for each cluster. These new means and variances are in turn used to generate a new estimate for the new weight values. This recursion is known to produce a result for the new weights which converges to some set of weight values, the convergence determined by changes in the values of the log-likelihood estimator at successive iterations. For instance, convergence is declared when the log-likelihood estimator changes by less than $10^{-10}$ in 10 successive iterations.

In some arrangements, a clustering algorithm 40 such an ANN is used prior to the matching 42 to provide additional insight into the likelihood of the new set of event parameter values to a particular cluster 30. For example, a result of inputting the new set of event parameter values $P_N^{(b)}$ into ANN 40 is a determination of a value of an error function. Initially, the values of the error function determine a cluster 30 to which $P_N^{(b)}$ belongs. Application of an EM algorithm, however, may change the cluster to which $P_N^{(b)}$ belongs, because the assigned new set of weight values determines an action to be taken, the action being associated with a set of rules for a cluster. An advantage of using the error function values, however, is that, in many situations, the action taken by event management server 18 is most likely the action determined by the cluster 30 determined by the range of error function values to which the error function value belongs. In this case, the EM algorithm which determines the new set of weight values would likely converge more quickly. When each prior set of event parameter values includes a value of an error function, then, the error function value serves as another event parameter value. The new set of event parameter values which includes an error function value is denoted as $P_N^{(b)*}$ in FIG. 4.

When an ANN is used prior to the EM algorithm, the matching 42 is done over the prior sets of event values 43 which include error weight values.

In some arrangements, event management server 18 converts, using an ANN, specific rules to more general rules by which event management server 18 assigns a new set of weight values to a larger range of new data packets. Suppose that, within a cluster, a rule exists which requires event management server 18 to issue an alert when three denials of access are issued to data packets incident from the same user on port 5443 within 60 seconds. Event management server 18 generalizes this rule based on the particular parameters involved in the rule which are, in this case, number of denials, source port number and time ranged. That is, a new set of rules for the cluster take the following form: event management server 18 issues an alert when N denials of access are issued to data packets incident from the same user on port P within T seconds. The values of N, P and T can vary within prespecified ranges, e.g., N takes values between 1 and 100, P takes values between 1 and 10000 and T takes values between 1 and 36000. For each set of values of N, P and T defining a specific rule, event management server 18 uses training data taken from one week of generated results (i.e., whether event management server 18 issued or did not issue an alert in response to an event). In some further arrangements, event management server 18 also issues an alert if a variance in the number of denied connections is greater than 10%.

Nevertheless, it is impractical to store all of the resulting information associated with the resulting vast number of specific rules associated with the generalized rules. Because, however, event management server 18 also assigns a set of weights to each set of event parameter values, event management server 18 is able to further group similar events together and then use the groups of similar events in an EM step to more accurately cluster and configure rules among clusters. That is, groups of events having similar parameter values are clustered and treated as a single event for which a set of probabilities are generated corresponding to possible values of remaining parameters. In this way, a more complete picture of the experiences of event management server 18 is presented for more accurate responses to new events.

Figure 5:
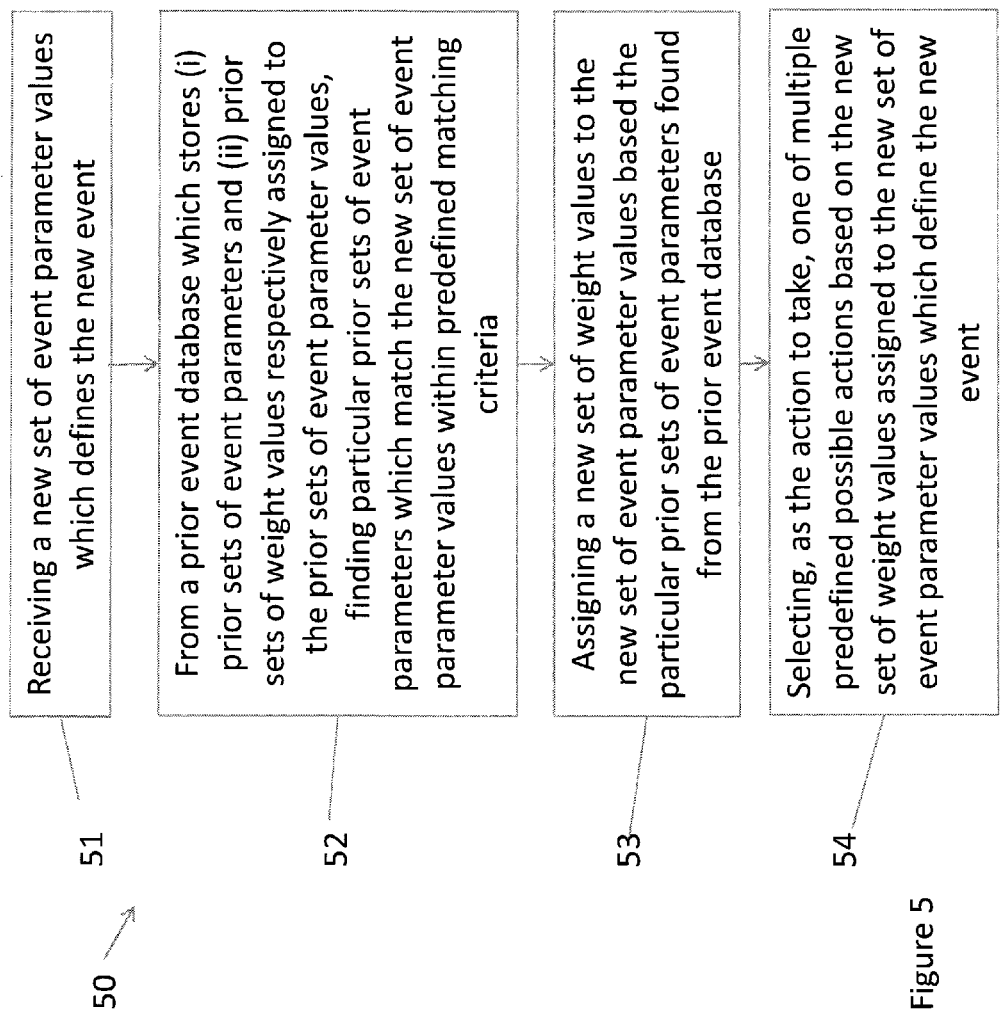
FIG. 5 is a flow chart illustrating a method of carrying out the improved technique within the electronic environment of FIG. 1.

FIG. 5 illustrates a method of identifying an action to take in response to a new event. In step 51, a new set of event parameter values which defines the new event is received. In step 52, particular prior sets of event parameters which match the new set of event parameter values within predefined matching criteria are found from a prior event database which stores (i) prior sets of event parameters and (ii) prior sets of weight values respectively assigned to the prior sets of event parameter values. In step 53, a new set of weight values to the new set of event parameter values are assigned based on the particular prior sets of event parameters found from the prior event database. In step 54, one of multiple predefined possible actions are selected as an action to take based on the new set of weight values assigned to the new set of event parameter values which define the new event.

While various embodiments of the invention have been particularly shown and described, it will be understood by those skilled in the art that various changes in form and details may be made therein without departing from the spirit and scope of the invention as defined by the appended claims.

For example, rather than the parameter extraction taking place at the event management server, the parameter extraction can take place at each access point device.

Also, the probability distributions used in naïve Bayes or EM algorithms can take the form of a Poisson distribution, a Student's t-distribution, a Voigt distribution, a Lorentz distribution, or any other distribution with finite or infinite support.

Further, other machine learning algorithms can be used for either the determination of the new set of weight values or for an initial clustering. Such machine learning algorithms include k-means clustering, k-median clustering, histogramming, fuzzy c—means clustering, and the like.

Furthermore, it should be understood that some embodiments are directed to an electronic environment which identifies an action to take in response to a new event. Some embodiments are directed to event management server 18. Some embodiments are directed to a system which identifies an action to take in response to a new event. Some embodiments are directed to a process of identifies an action to take in response to a new event. Also, some embodiments are directed to a computer program product which enables computer logic to perform the identification of an action to take in response to a new event.

In some arrangements, event management server 18 is implemented by a set of processors or other types of control/processing circuitry running software. In such arrangements, the software instructions can be delivered to event management server 18 in the form of a computer program product 80 (illustrated generally by a diskette icon 80 in FIG. 2) having a computer readable storage medium which stores the instructions in a non-volatile manner. Examples of suitable computer readable storage media include tangible articles of manufacture and apparatus such as CD-ROM, flash memory, disk memory, tape memory, and the like.

What is claimed is:

1. A computer-based method of identifying an action to take in response to a new event, the method comprising:

receiving a new set of event parameter values which defines the new event:

from a prior event database which stores (i) prior sets of event parameters and (ii) prior sets of weight values respectively assigned to the prior sets of event parameter values, finding particular prior sets of event parameters which match the new set of event parameter values within predefined matching criteria;

assigning a new set of weight values to the new set of event parameter values based on the particular prior sets of event parameters found from the prior event database, and selecting, as the action to take, one of multiple predefined possible actions based on the new set of weight values assigned to the new set of event parameter values which define the new event;

wherein the prior event database stores (i) a first prior set of event parameter values which defines a first prior event, (ii) a second prior set of event parameter values which defines a second prior event, and (iii) a third prior set of event parameter values which defines a third prior event;

wherein a first prior set of weight values is assigned to the first prior set of event parameter values, a second prior set of weight values is assigned to the second set of event parameter values and a third prior set of weight values is assigned to the third set of event parameter values; and wherein finding the particular prior sets of event parameter values which match the new set of event parameter values within the predefined matching criteria includes identifying the first and second prior sets of event parameter values as the particular prior sets of event parameter values and excluding the third prior set of event parameter values from the particular prior sets of event parameter values.

2. A method as in claim 1, wherein each event parameter value of the new set of event parameter values corresponds to an event parameter value of the first set of event parameter values; and wherein identifying the first set of event parameter values as the particular prior sets of event parameter values includes:

finding an event parameter value of the first set of event parameter values for which an absolute difference between the event parameter value of the first set of event parameter values and a corresponding event parameter value of the new set of event parameter values is less than a specified threshold value.

3. A method as in claim 2, wherein each weight value of the new set of weight values corresponds to a predefined possible action of the multiple predefined possible actions;

wherein each weight value of the new set of weight values is indicative of a probability of the predefined possible action of the multiple predefined possible actions corresponding to the weight value being selected in response to the new event;

wherein selecting one of multiple predefined possible actions based on the new set of weight values includes:

finding a largest weight value of the new set of weight values; and selecting the predefined possible action corresponding to the largest weight value.

4. A method as in claim 3, wherein assigning the set of new weight values includes:

generating a probability distribution from the particular prior sets of event parameter values and the prior sets of weight values respectively assigned to the particular prior sets of event parameter values; and setting each weight value of the set of new weight values to a probability value governed by the probability distribution.

5. A method as in claim 4, wherein setting each weight value of the set of new weight values to a probability value governed by the probability distribution includes:
assigning an event-independent probability value of a set of event-independent probability values to each predefined possible action of the multiple predefined possible actions; and
applying an expectation-maximization procedure to the particular prior sets of event parameter values and the prior sets of weight values respectively assigned to the particular prior sets of event parameter values;
wherein the expectation-maximization procedure is constructed and arranged to maximize a value of a likelihood function which is indicative of a validity of assigning the updated new set of weight values to the new set of event parameter values, values of the likelihood function being based on the new set of weight values and the set of event-independent probability values.

6. A method as in claim 5, wherein applying the expectation-maximization procedure includes:
iterating over an expectation step and a maximization step;
wherein the expectation step includes:
generating a new set of weight values from an updated probability distribution; and
computing a value of the likelihood function;
wherein the maximization step includes:
updating the generated probability distribution from the generated new set of weights; and
incrementing an iteration counter value; and
wherein iterating over the expectation step and the maximization step continues until an absolute difference between the value of the likelihood function at a first iteration counter value and the value of the likelihood function at a second iteration counter value is smaller than a predefined threshold value.

7. A method as in claim 6, wherein the method further comprises:
prior to finding particular prior sets of event parameters which match the new set of event parameter values within predefined matching criteria, inputting the new set of event parameter values into an artificial neural network (ANN), output of the ANN including an error metric value defined by a closeness of the input into the ANN to output which the ANN generates in response to training data input; and
adding the error metric value to the new set of event parameter values.

8. A method as in claim 1, wherein receiving the set of new event parameters includes:
receiving, from a first hardware device, a signal containing a first access request; and
extracting the new set of event parameters from the first access request;
wherein the method further comprises:
receiving, from a second hardware device, a signal containing a second access request;
extracting another set of event parameters from the second access request;
wherein identifying the second set of event parameter values as the particular prior sets of event parameter values includes:
finding an event parameter value of the second set of event parameter values for which an absolute difference between the event parameter value of the second set of event parameter values and a corresponding event parameter value of the another set of event parameter values is less than a specified threshold value.

9. A method as in claim 8, wherein extracting the new set of event parameters includes:
normalizing each event parameter of the new set of event parameters to a number having a value between zero and one.

10. A system constructed and arranged to identify an action to take in response to a new event, the system comprising:
a network interface connected to a network;
a memory; and
a processor coupled to the memory, the processor constructed and arranged to:
receive a new set of event parameter values which defines the new event:
from a prior event database which stores (i) prior sets of event parameters and (ii) prior sets of weight values respectively assigned to the prior sets of event parameter values, find particular prior sets of event parameters which match the new set of event parameter values within predefined matching criteria;
assign a new set of weight values to the new set of event parameter values based on the particular prior sets of event parameters found from the prior event database, and
select, as the action to take, one of multiple predefined possible actions based on the new set of weight values assigned to the new set of event parameter values which define the new event;
wherein the prior event database stores (i) a first prior set of event parameter values which defines a first prior event, (ii) a second prior set of event parameter values which defines a second prior event, and (iii) a third prior set of event parameter values which defines a third prior event;
wherein a first prior set of weight values is assigned to the first prior set of event parameter values, a second prior set of weight values is assigned to the second set of event parameter values and a third prior set of weight values is assigned to the third set of event parameter values; and
wherein finding the particular prior sets of event parameter values which match the new set of event parameter values within the predefined matching criteria includes identifying the first and second prior sets of event parameter values as the particular prior sets of event parameter values and excluding the third prior set of event parameter values from the particular prior sets of event parameter values.

11. A system as in claim 10, wherein each event parameter value of the new set of event parameter values corresponds to an event parameter value of the first set of event parameter values; and
wherein identifying the first set of event parameter values as the particular prior sets of event parameter values includes:
finding an event parameter value of the first set of event parameter values for which an absolute difference between the event parameter value of the first set of event parameter values and a corresponding event parameter value of the new set of event parameter values is less than a specified threshold value.

12. A system as in claim 11, wherein each weight value of the new set of weight values corresponds to a predefined possible action of the multiple predefined possible actions;
wherein each weight value of the new set of weight values is indicative of a probability of the predefined possible action of the multiple predefined possible actions corresponding to the weight value being selected in response to the new event;

wherein selecting one of multiple predefined possible actions based on the new set of weight values includes:
finding a largest weight value of the new set of weight values; and
selecting the predefined possible action corresponding to the largest weight value.

13. A system as in claim 12, wherein assigning the set of new weight values includes:
generating a probability distribution from the particular prior sets of event parameter values and the prior sets of weight values respectively assigned to the particular prior sets of event parameter values; and
setting each weight value of the set of new weight values to a probability value governed by the probability distribution.

14. A system as in claim 13, wherein setting each weight value of the set of new weight values to a probability value governed by the probability distribution includes:
assigning an event-independent probability value of a set of event-independent probability values to each predefined possible action of the multiple predefined possible actions; and
applying an expectation-maximization procedure to the particular prior sets of event parameter values and the prior sets of weight values respectively assigned to the particular prior sets of event parameter values;
wherein the expectation-maximization procedure is constructed and arranged to maximize a value of a likelihood function which is indicative of a validity of assigning the updated new set of weight values to the new set of event parameter values, values of the likelihood function being based on the new set of weight values and the set of event-independent probability values.

15. A system as in claim 14, wherein applying the expectation-maximization procedure includes:
iterating over an expectation step and a maximization step;
wherein the expectation step includes:
generating a new set of weight values from an updated probability distribution; and
computing a value of the likelihood function;
wherein the maximization step includes:
updating the generated probability distribution from the generated new set of weights; and
incrementing an iteration counter value; and
wherein iterating over the expectation step and the maximization step continues until an absolute difference between the value of the likelihood function at a first iteration counter value and the value of the likelihood function at a second iteration counter value is smaller than a predefined threshold value.

16. A system as in claim 15, wherein the processor is further constructed and arranged to:
prior to finding particular prior sets of event parameters which match the new set of event parameter values within predefined matching criteria, input the new set of event parameter values into an artificial neural network (ANN), output of the ANN including an error metric value defined by a closeness of the input into the ANN to output which the ANN generates in response to training data input; and
add the error metric value to the new set of event parameter values.

17. A computer program product having a non-transitory computer readable storage medium which stores code to identify an action to take in response to a new event, the code including instructions to:
receive a new set of event parameter values which defines the new event;
from a prior event database which stores (i) prior sets of event parameters and (ii) prior sets of weight values respectively assigned to the prior sets of event parameter values, find particular prior sets of event parameters which match the new set of event parameter values within predefined matching criteria;
assign a new set of weight values to the new set of event parameter values based on the particular prior sets of event parameters found from the prior event database, and
select, as the action to take, one of multiple predefined possible actions based on the new set of weight values assigned to the new set of event parameter values which define the new event;
wherein the prior event database stores (i) a first prior set of event parameter values which defines a first prior event, (ii) a second prior set of event parameter values which defines a second prior event, and (iii) a third prior set of event parameter values which defines a third prior event;
wherein a first prior set of weight values is assigned to the first prior set of event parameter values, a second prior set of weight values is assigned to the second set of event parameter values and a third prior set of weight values is assigned to the third set of event parameter values; and
wherein finding the particular prior sets of event parameter values which match the new set of event parameter values within the predefined matching criteria includes identifying the first and second prior sets of event parameter values as the particular prior sets of event parameter values and excluding the third prior set of event parameter values from the particular prior sets of event parameter values.

* * * * *